United States Patent
Kapusky et al.

(10) Patent No.: US 10,415,628 B2
(45) Date of Patent: Sep. 17, 2019

(54) CABLE RELEASE BYPASS SYSTEM AND VEHICLE SEAT WITH CABLE RELEASE BYPASS SYSTEM

(71) Applicant: Adient Engineering and IP GmbH, Burscheid (DE)

(72) Inventors: Michael Kapusky, South Lyon, MI (US); Duane Potes, Adrian, MI (US); Nathan Caruss, Ann Arbor, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 36 days.

(21) Appl. No.: 15/611,377

(22) Filed: Jun. 1, 2017

(65) Prior Publication Data

US 2018/0347619 A1   Dec. 6, 2018

(51) Int. Cl.
*B60N 2/22* (2006.01)
*F16C 1/10* (2006.01)
*B60N 2/30* (2006.01)
*F16C 1/16* (2006.01)
*F16C 1/18* (2006.01)

(52) U.S. Cl.
CPC ............... *F16C 1/101* (2013.01); *B60N 2/22* (2013.01); *B60N 2/3009* (2013.01); *B60N 2/3045* (2013.01); *F16C 1/10* (2013.01); *F16C 1/102* (2013.01); *F16C 1/16* (2013.01); *F16C 1/18* (2013.01); *F16C 2326/08* (2013.01)

(58) Field of Classification Search
CPC ... F16C 1/101; F16C 1/16; B60N 2/22; B60N 2/3009; B60N 2/3045

USPC .. 297/283.2, 337, 354.1, 378.1, 378.12, 332
See application file for complete search history.

(56) References Cited

U.S. PATENT DOCUMENTS

| 6,474,739 | B1* | 11/2002 | Lagerweij | B60N 2/0705 |
| | | | | 297/341 |
| 9,233,627 | B2* | 1/2016 | Michalak | B60N 2/0232 |
| 2004/0007909 | A1* | 1/2004 | Bonk | B60N 2/20 |
| | | | | 297/378.13 |
| 2009/0167068 | A1* | 7/2009 | Yamagishi | B60N 2/12 |
| | | | | 297/340 |
| 2010/0164265 | A1* | 7/2010 | Tomandl | B60N 2/0224 |
| | | | | 297/326 |
| 2010/0225151 | A1* | 9/2010 | Michalak | B60N 2/0232 |
| | | | | 297/344.1 |
| 2013/0200668 | A1* | 8/2013 | Michalak | B60N 2/0232 |
| | | | | 297/217.1 |

(Continued)

*Primary Examiner* — Mark R Wendell
(74) *Attorney, Agent, or Firm* — McGlew and Tuttle, P.C.

(57) ABSTRACT

A cable actuator system includes an actuating cable for connection to an actuator and to an actuatable device and a bypass assembly connected to the actuating cable. The bypass assembly includes a bypass input with a first input position and with a second input position. With the bypass input in the first input position the bypass assembly acts on the cable such that an actuating movement of the cable by the actuator moves the cable an actuating distance at the actuatable device to actuate the actuatable device. With the bypass input in the second input position the bypass assembly acts on the cable such that the actuating movement of the cable by the actuator does not move the cable the actuating distance at the actuatable device. A vehicle seat, with a seat base, a backrest, an actuator, and a vehicle seat actuatable device, also includes the cable actuator system.

16 Claims, 9 Drawing Sheets

(56) References Cited

U.S. PATENT DOCUMENTS

2016/0052424 A1\* 2/2016 Ferguson ................ B60N 2/04
297/344.1

\* cited by examiner

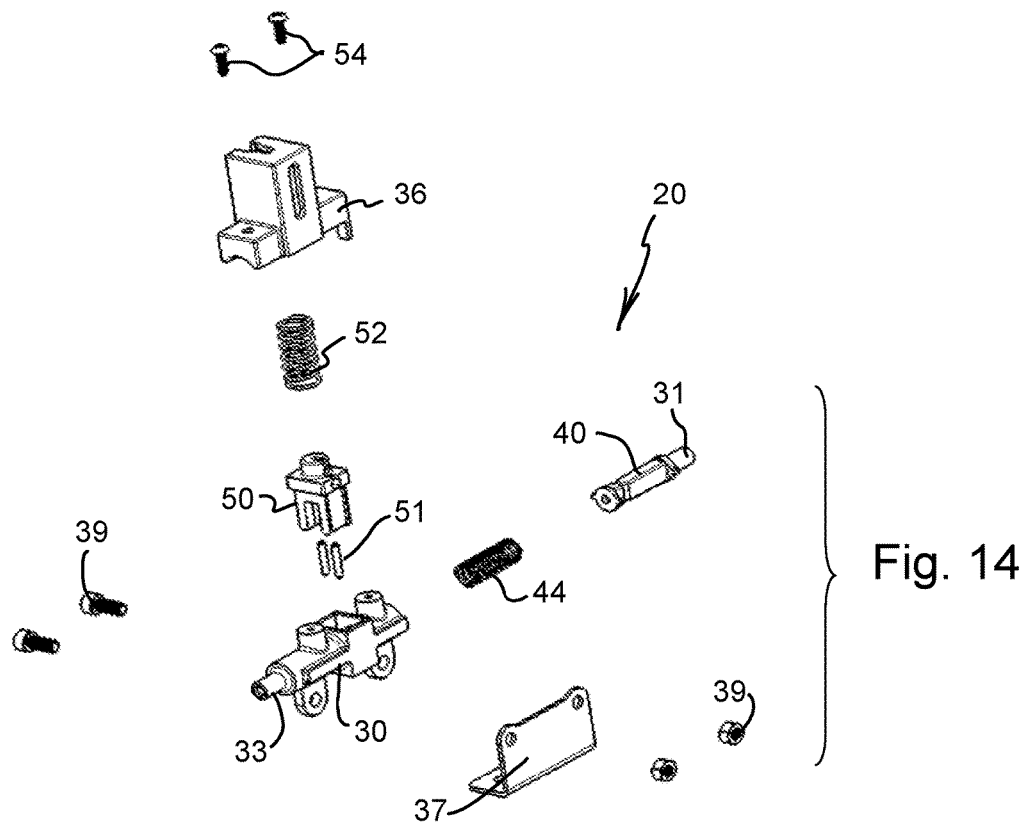
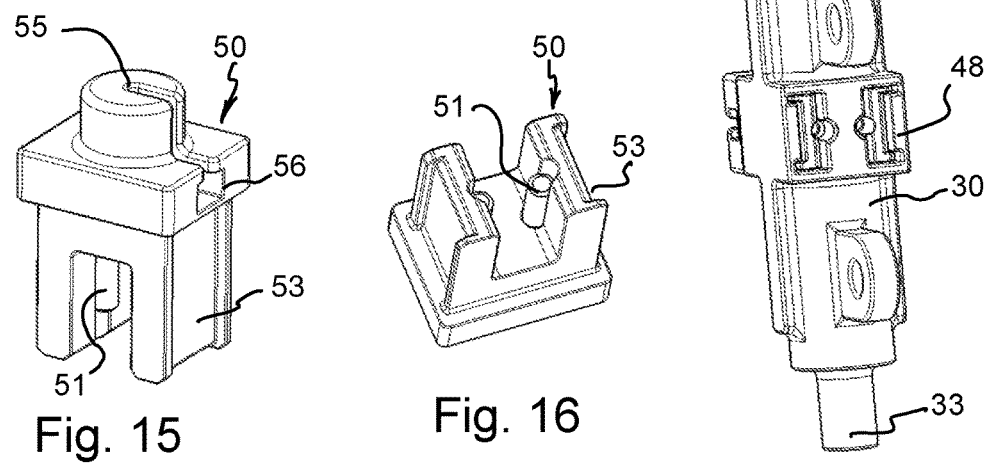

CABLE RELEASE BYPASS SYSTEM AND VEHICLE SEAT WITH CABLE RELEASE BYPASS SYSTEM

FIELD OF THE INVENTION

The present invention relates to a cable system such as a Bowden cable system and further relates to a vehicle seat with a cable system

BACKGROUND OF THE INVENTION

Bowden cables, a type of flexible cable, are used to transmit mechanical force or energy by the movement of an inner cable relative to an outer housing (also known as a guide cable or a sheaf). Bowden cable systems are particularly used in automotive applications, such as to transmit an actuating force from an actuator to an actuatable device. Vehicle seats employ Bowden cables between release handles (the actuator) and release latch mechanisms or fittings (the actuatable device).

SUMMARY OF THE INVENTION

It is an object of the invention to provide a cable system, such as a Bowden cable system or cable system with Bowden cable type features, that transmits an actuating force and actuating motion from an actuator to an actuatable device to provide an actuating movement at the actuatable device to actuate the actuatable device and which includes a bypass input that changes the effect of the actuator, such that the actuating motion of the actuator does not provide an actuating movement at the actuatable device so as to not actuate the actuatable device.

According to the invention, a cable actuator system is provided comprising an actuating cable for connection to an actuator and to an actuatable device and a bypass assembly connected to the actuating cable. The bypass assembly comprises a bypass input with a first input position and a second input position. With the bypass input in the first input position the bypass assembly acts on the cable such that an actuating movement of the cable by the actuator moves the cable an actuating distance at the actuatable device to actuate the actuatable device. With the bypass input in the second input position the bypass assembly acts on the cable such that the actuating movement of the cable by the actuator does not move the cable the actuating distance at the actuatable device.

The actuating cable advantageously comprises an inner cable having an actuator end for connection to an actuator and an actuatable device end for connection to an actuatable device. The actuating cable also advantageously comprises an outer guide cable (sheaf). The bypass assembly may act on the actuating cable in the first input position by holding or maintaining a position of the outer guide cable (sheaf) while allowing the inner cable to pass through (or pass relative to) the bypass assembly and to move relative to the bypass assembly and to move relative to the outer guide cable (sheaf). The bypass assembly may act on the actuating cable in the second input position by releasing or allowing movement (such as limited movement) of the outer guide cable (sheaf) while allowing the inner cable to pass through (or pass relative to) the bypass assembly and to move relative to the bypass but with movement (at least limited movement) of the outer guide cable (sheaf) with the inner cable. The releasing of the outer guide cable (sheaf)—allowing some movement of the outer guide cable (sheaf)—creates what is termed a lost motion. This provides less relative movement between the guide cable (sheaf) and the actuator inner cable and results in insufficient motion of the inner cable at the recliner latch 29. This results in an actuating motion of the actuator, wherein some of this motion is lost to the actuatable device as the normal actuating motion of the actuator does not result in an actuation of the actuatable device.

The sheaf of the actuating cable advantageously has a sheaf bypass assembly end and an actuator end. The bypass assembly may comprise a bypass housing and a sheaf piston positioned for limited movement in the bypass assembly. The sheaf bypass assembly end is fixed to the sheaf piston. The bypass input comprises a locking arrangement fixing a position of the sheaf piston relative to the bypass housing in the first input position and releasing the sheaf piston in the second input position, to allow limited movement of the sheaf piston relative to the bypass housing.

The bypass assembly advantageously further comprises a biasing spring biasing the sheaf piston, with a biasing force, into the first input position for being locked by the locking arrangement. In the second input position the limited movement of the sheaf piston relative to the bypass housing is movement against the biasing force of the biasing spring. The biasing spring, the bypass housing and the sheaf piston element may be configured to establish the limited movement of the sheaf piston relative to the bypass housing against the biasing force of the biasing spring such that the limited movement is greater than the actuating distance movement of the cable at the actuatable device to actuate the actuatable device.

The bypass input locking arrangement may further comprise an input unit housing portion connected to or forming a portion of the bypass housing. A lock element and a lock element spring are supported by the input unit housing portion. The lock element spring biases the lock element into a locked position with the sheaf piston in the first input position. The bypass input may further comprise an input cable, with an outer sheaf connected to the input unit housing portion and with an inner cable connected to the lock element. The bypass inner cable moves the lock element from a locked position corresponding to the first input position to an unlocked position corresponding to the second input position. The bypass housing may hold the lock biasing spring and also form a stop for piston at locked position. The bypass housing may hold the lock biasing spring in place above the lock element. The lock element may comprise metal lock pins supported by a lock body. The locking pins engage the piston to lock the piston in the position of the sheaf piston relative to the bypass housing corresponding to the first input position. The lock element releases the sheaf piston in the second input position, to allow limited movement of the sheaf piston relative to the bypass housing. The lock pins may engage the bypass housing for additional strength.

According to another aspect of the invention, a vehicle seat is provided. The vehicle seat comprises a seat base a backrest mounted to pivot relative to the seat base, an actuator moveable from a rest position to a release actuating position, a vehicle seat actuatable device and a cable actuator system. The cable actuator system comprises an actuating cable connected to the actuator and connected to the vehicle seat actuatable device and a bypass assembly connected to the actuating cable. The bypass assembly comprises a bypass input with a first input position and a second input position. With the bypass input in the first input position the bypass assembly acts on the cable such that an actuating movement of the cable by the actuator moves the cable an actuating distance at the vehicle seat actuatable device to actuate the vehicle seat actuatable device. With the bypass input in the second input position the bypass assembly acts on the cable such that the actuating movement of the cable by the actuator does not move the cable the actuating distance at the vehicle seat actuatable device.

A fitting with a release latch is advantageously connected to the backrest. The fitting with the release latch prevents the backrest from pivoting (in particular pivoting forward) relative to the seat base in a latched state and releases the backrest to pivot forward relative to the seat base in a released state. The actuator may be a release actuator operatively connected to the cable actuator system. The vehicle seat actuatable device may be the release latch of the fitting and may be operatively connected to the cable actuator system.

The seat base may be mounted to pivot up toward the backrest from a seat design position to a stadium position. The seat base may be operatively connected to the bypass input of the cable actuator system. Movement of the seat base from the design position to the stadium position changes the bypass input from the first input position to the second input position, such that movement of the release actuator from the rest position to the release actuating position does not release the release latch with the seat base in the stadium position. Movement of the seat base from the stadium position to the design position changes the bypass input from the second input position to the first input position, such that movement of the release actuator from the rest position to the release actuating position does release the release latch.

The features and object of the invention are born from the need to deactivate one or more actuating devices—release levers, release handles etc.—particularly with vehicle seats. This need particularly arises with a vehicle seat configuration with a seat cushion (seat base) that is also placed into a stadium position. In such a stadium position, the seat base pivots upward toward the backrest. This stadium position is a position corresponding to a seat that is not being used in a stadium or in a theater. Such a stadium position allows access past the seat, whereby users more easily pass the upwardly pivoted seat base. The vehicle seat configuration may also include a backrest which can be folded forward to a fold flat position. It is a further object of the invention to provide such a seat with a cable system with a release handle (actuator) that is to be used to release a latch in a fitting to fold the backrest forward and possibly move the seat base and backrest to a seat fold flat position. It was determined that it would be best if the user would not fold the backrest of the seat flat when the seat cushion is set to the stadium position.

The cable system features of the invention may be used with other seat and with other situations in which an actuator function is to be bypassed or not effective based on certain situations. The change in status (change in situation) is provided by a bypass input as described.

It is a further object of the invention to provide a cable system that allows the occupant or user to pull a release handle, or actuate an actuator, such that the actuator does not release the actuatable device—a release latch. Preventing the actuation may avoid some situation such as preventing a backrest from folding flat, if the seat cushion (seat base) is set to the stadium position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 14 is an exploded view of the cable release bypass assembly;

FIG. 15 is a perspective view of a lock element of the cable release bypass assembly;

FIG. 16 is another perspective view of the lock element;

FIG. 17 is a perspective view of a bypass device housing, showing the actuator guide cable piston end in a position corresponding to the first input position;

DESCRIPTION OF THE PREFERRED EMBODIMENT

Figure 1:
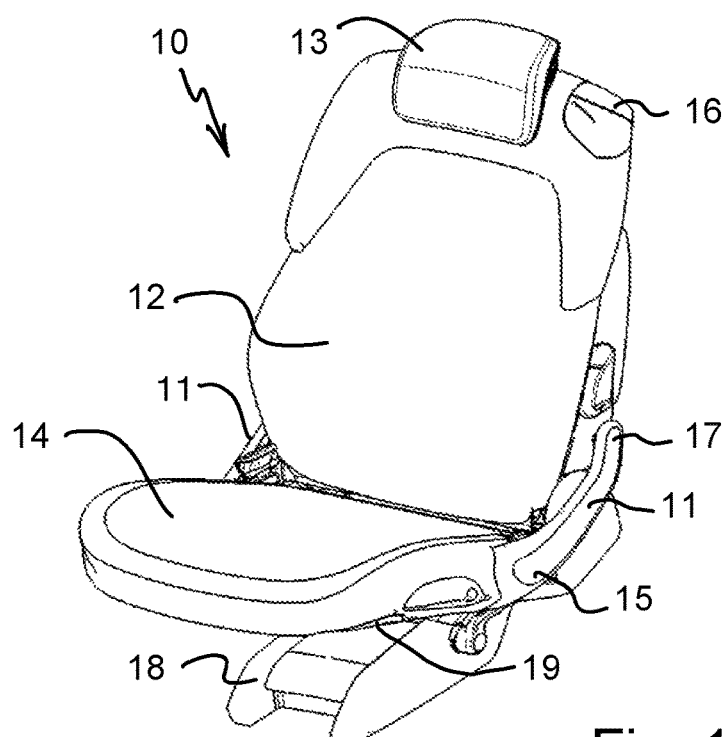
FIG. 1 is a perspective view of a vehicle seat, with the cable release bypass system according to the invention, with the seat shown in a design position.

Referring to the drawings in particular, FIG. 1 shows a vehicle seat generally designated 10, according to the invention. The vehicle seat 10 comprises a backrest 12 with a connected headrest 13. A seat base (also known as a cushion) 14 is connected to the backrest 12 via a seat base to backrest link arm 11, provided at each side of the vehicle seat 10. The seat base to backrest link arm 11 has a seat base pivot 15, that pivotably connects the seat base 14 to the link arm 11 and has a backrest link arm pivot connection 17, that pivotably connects the backrest 12 to the link arm 11. The backrest 12 is connected to a support base 18 via fittings 28 at each side. The support base 18 is connected to a floor of a vehicle.

Figure 2:
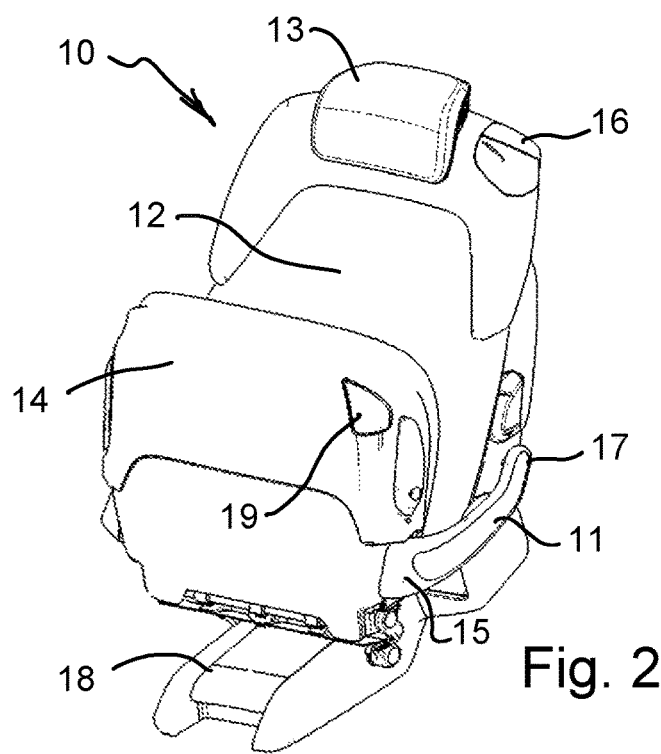
FIG. 2 is a perspective view of the vehicle seat of FIG. 1, with the seat base (cushion) in a stadium position.
Figure 3:
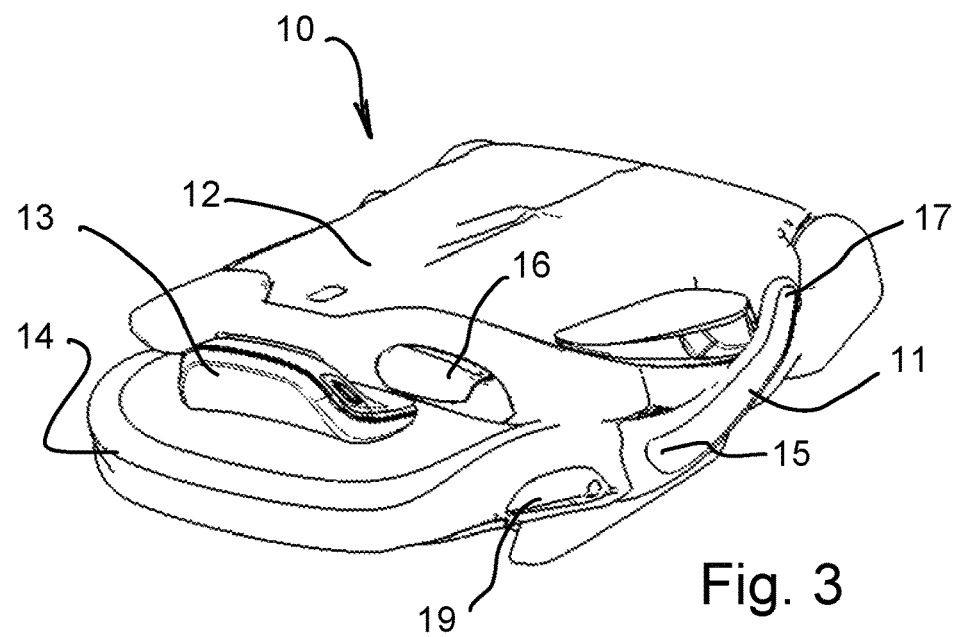
FIG. 3 is a perspective view showing the vehicle seat of FIG. 1 in a fold flat position, with the backrest pivoted forward.

The seat base pivots 15, of the respective link arms 11, connect the frame of the seat base 14, at each side, to the corresponding link arm 11. The backrest link arm pivots 17, of each link arm 11, connect the link arm 11 at each side, to the frame of the backrest 12. The configuration allows for a pivoting up of the seat base 14, from a design position as shown in FIG. 1, to a stadium position as shown in FIG. 2. A stadium seat actuator lever 19 releases a latching device to allow the seat base 14 to pivot from the design position to the stadium position and/or releases a latching device to allow the seat base 14 to pivot from the stadium position to the design position (FIG. 2). The stadium seat actuator lever 19 is associated with a simple latch that releases the seat base 14 and allows the seat base 14 to move from the design position (FIG. 1) to the stadium position. The further actuation of the handle (lever) 19 releases the latch to go from the stadium position to the design position. One or both of the fittings 28 have a recliner latch 29, that allows a pivoting of the backrest 12 relative to the base 18. If a release latch 29 is provided at each of the fittings 28, a transmission shaft connects the two fittings 28 so that the release of the latch 29 of one fitting 28 results in the release of the latch 29 of the other fitting 29. Releasing the recliner latch 29 allows a pivoting of the backrest 12 relative to the seat base 14 to set the angle of recline of the backrest 12. Further, releasing the recliner latch 29 provides for a pivoting of the backrest 12 forward relative to the seat base 14 to achieve the fold flat position as shown in FIG. 3. The releasing the recliner latch 29 may also provide a dumping forward of the backrest and disconnect a longitudinal adjustment rail arrangement for pass through access behind the vehicle seat. A release handle (actuator) 16 is provided on the backrest 12. The release handle (actuator) 16 releases the latch 29 as discussed further below.

Figure 4:
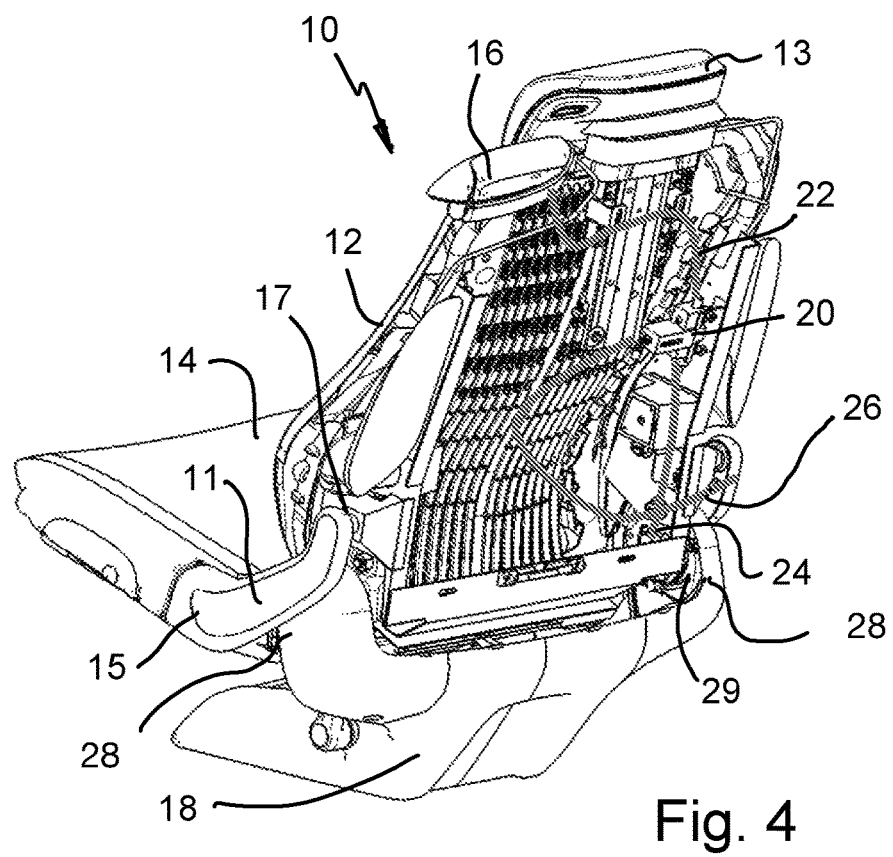
FIG. 4 is a rear perspective view of the vehicle seat of FIG. 1, shown with the rear cover/trim removed.

FIG. 4 shows the rear side of the vehicle seat 10 with the trim and cover removed. This shows the cable release bypass system according to the invention. The cable release bypass system comprises a cable release bypass assembly (CRBA) 20. The CRBA or bypass device 20 has two inputs and an output. Essentially, an input is connected to an actuator, in the form of the release handle 16, and the output is connected to an vehicle seat actuatable device, in the form of the recliner latch 29. The other input is a bypass input with a first input state or first input position and a second input state or second input position. Depending on whether the bypass input is in the first input state (first input position) or the second input state (second input position), the input of the actuator to the bypass device 20 either results in actuation at the vehicle seat actuatable device 29 or results in no actuation at the vehicle seat actuatable device 29. In the embodiment of the vehicle seat 10 shown, the bypass input is based on the state of the seat base 14. As described further below, with the seat base 14 in the design position (FIG. 1), the bypass input is in the first input state (first input position), whereby actuation of the release handle 16 releases the recliner latch 29 and allows the backrest 12 to pivot forward to the fold flat position (FIG. 3). With the seat base in the stadium position (FIG. 2), the bypass input is in the second input state (second input position), whereby actuation of the release handle 16 does not release the recliner latch 29 and does not allow the backrest 12 to pivot forward to the fold flat position.

The invention provides the multiple states of the actuator (release handle) 16, while still employing a cable system. In particular, the release bypass system according to the invention uses an actuating cable—a Bowden cable (or similar)—with an inner cable 23 extending from the actuator (release handle 16) all the way to the vehicle seat actuatable device (recliner latch 29) and with one or more outer guide cable 22. The CRBA 20 is connected to the actuating cable. The inner cable 23 is physically both the first input and the output of the CRBA 20. However, depending upon the state of the second input, the output changes, given the same input. The inner cable 23 of the actuating cable connects both to the actuator (release handle 16) and to an vehicle seat actuatable device (recliner latch 29). The CRBA 20 comprises a bypass input, the second input of the CRBA 20, with a first input position and a second input position. With the bypass input in the first input position the bypass device 20 acts on the cable 22/23 such that an actuating movement of the cable (the inner cable 23) at the actuator 16 moves the cable (in particular the inner cable 23) an actuating distance at the vehicle seat actuatable device 29 to actuate the vehicle seat actuatable device 29. With the bypass input in the second input position, the bypass device 20 acts on the cable 22/23 such that the actuating movement of the cable (the inner cable) by the actuator does not move the cable (in particular the inner cable 23) the actuating distance at the actuatable device 29.

Figure 11:
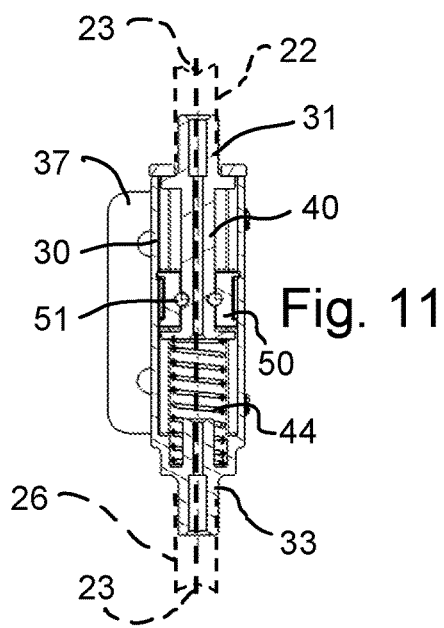
FIG. 11 is a sectional view taken along line XI-XI of FIG. 10, and also schematically showing, in dashed line, a release handle guide cable (sheaf) at one end and a recliner latch guide cable (sheaf) at another end and showing the associated actuator inner cable.
Figure 12:
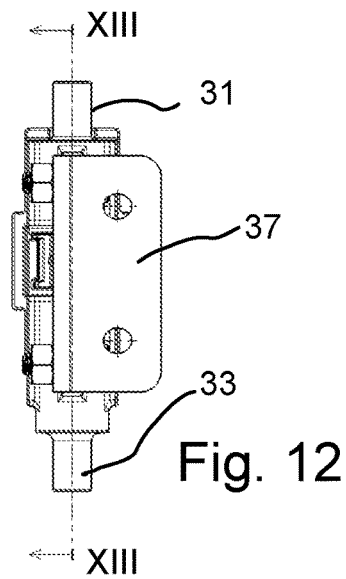
FIG. 12 is a rear end view of the cable release bypass assembly.

In the embodiment of the vehicle seat 10, the cable release bypass system includes the CRBA 20 cooperating with a cable including actuator inner cable 23, a release handle guide cable (sheaf) 22, with an end fixed to the CRBA 20, and with a recliner latch guide cable (sheaf) 26, with an end fixed to the CRBA 20 (FIG. 11). The CRBA 20 is connected to a bypass input guide cable (sheaf) 24 with an inner cable 25. The bypass input of the CRBA 20 is connected to the bypass input inner cable 25. The release handle guide cable (sheaf) 22, the bypass input guide cable (sheaf) 24, the recliner latch guide cable (sheaf) 26 are each shown in FIG. 4. The actuator inner cable 23, the release handle guide cable (sheaf) 22 and the recliner latch guide cable (sheaf) 26 are shown schematically (in dashed line) in FIG. 11.

Figure 5:
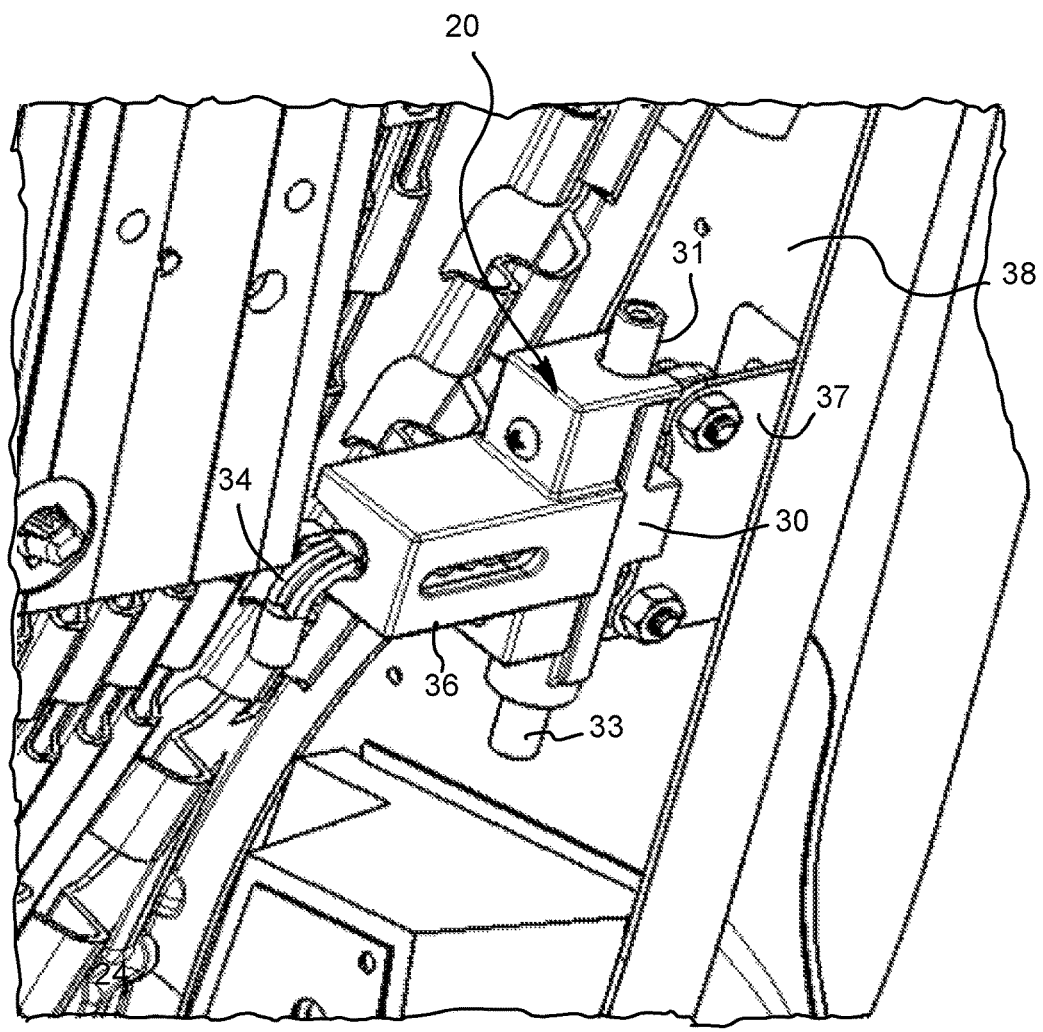
FIG. 5 is a partial, enlarged, rear perspective view, showing the vehicle seat with the rear cover/trim removed.

As can be seen in FIG. 5, the CRBA 20 has a bypass device housing 30 with an actuated guide cable housing connection 33. The bypass device housing 30 supports a piston 40 with an actuator guide cable piston end 31. The CRBA 20 has a bypass input unit housing 36. A bypass input cable 90° fitting 34 is connected to the bypass input unit housing 36. A bypass device bracket 37 is connected, by bracket fasteners 39, to the bypass device housing 30. The bypass device bracket 37 connects the bypass device housing 30 to a backrest frame side bracket 38, of the backrest 12. The shown embodiment of the CRBA 20 has the release handle guide cable (sheaf) 22 fixed on the actuator guide cable piston end 31, and moveable therewith. The recliner latch guide cable (sheaf) 26 is fixed to actuated guide cable housing connection 33. The actuator inner cable 23 passes through the CRBA 20, as shown in FIG. 11. The bypass input guide cable (sheaf) 26 is fixed to an end of the bypass input cable 90° fitting 34, whereas the bypass input inner cable 25 passes through the bypass input cable 90° fitting 34 and into the bypass input unit housing 36, and is connected to a locking element 50 within the CRBA 20 (FIG. 13C).

Figure 6A:
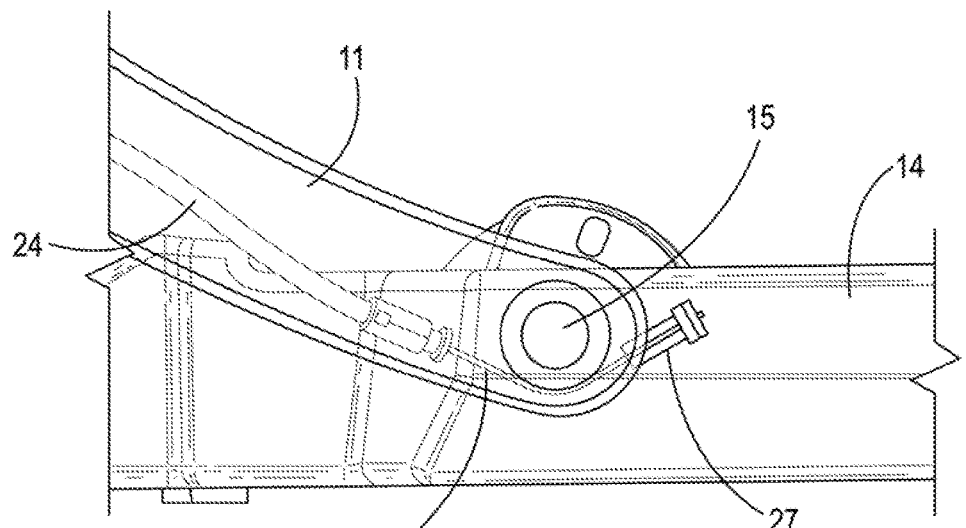
FIG. 6A is a side view of the seat base, pivotably connected to a backrest link, shown in the design position.
Figure 6B:
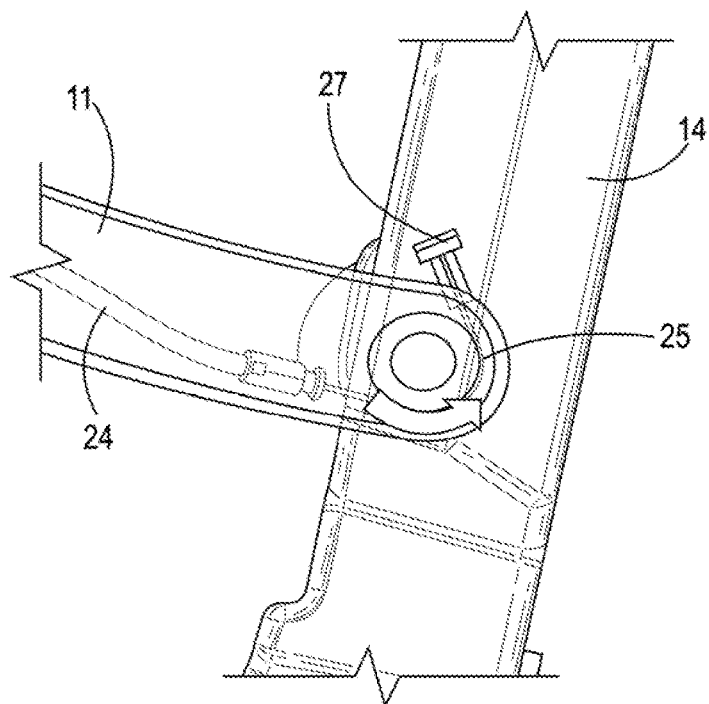
FIG. 6B is a side view of the seat base, pivotably connected to a backrest link, shown in the stadium position.

FIG. 6A shows a portion of the vehicle seat 10, including the seat base to backrest link arm 11, pivotably connected to the seat base 14 at seat base pivot 15. FIG. 6A also shows the bypass input guide cable 24 and the inner cable 25, which inner cable 25 extends to a bypass input inner cable support 27. The support 27 fixes an end of the inner cable 25 to the seat base 14. The bypass input guide cable (sheaf) 24 has an end which is fixed to the link arm 11. With this arrangement, pivoting the seat base 14, in the direction of the arrow in FIG. 6B, pulls the inner cable 25.

Figure 7:
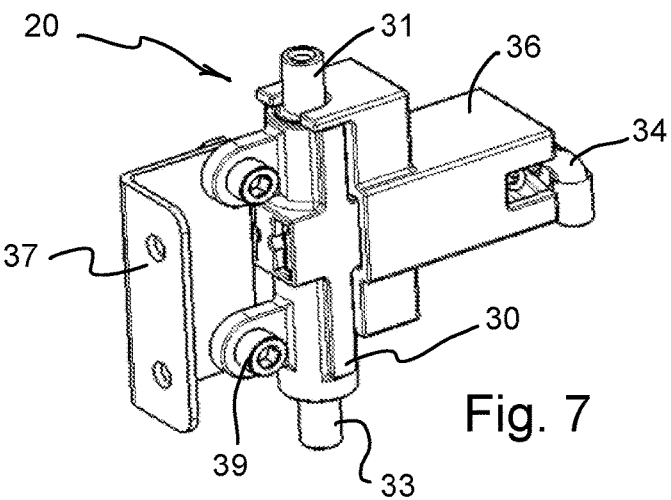
FIG. 7 is a perspective view of a cable release bypass assembly according to the invention.
Figure 8A:
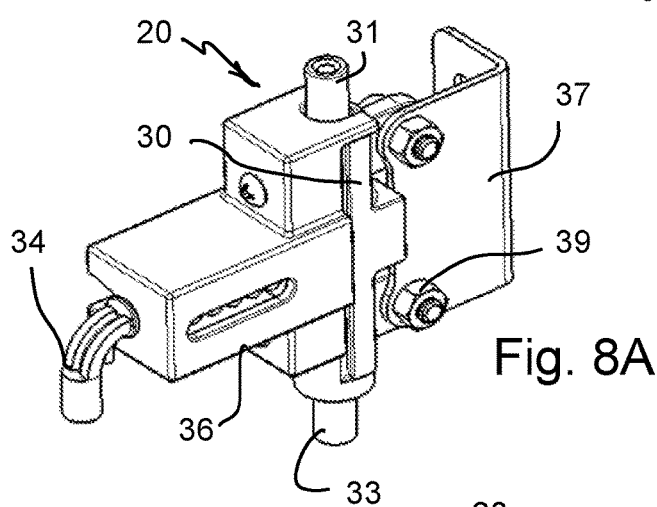
FIG. 8A is another perspective view of the cable release bypass assembly of FIG. 7, shown with an actuator guide cable piston end in a position corresponding to a first input position.
Figure 8B:
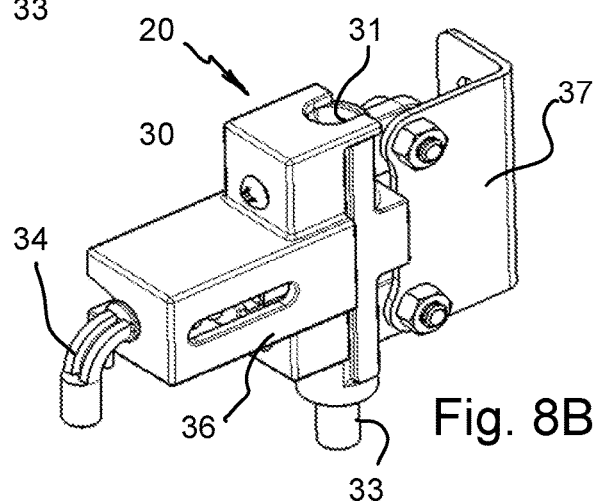
FIG. 8B is a perspective view corresponding to FIG. 8A, shown with the actuator guide cable piston end in a position corresponding to a second input position.
Figure 9:
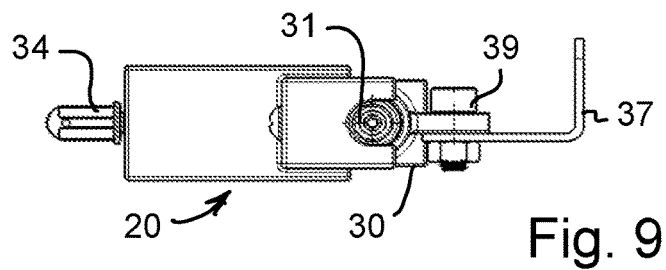
FIG. 9 is a top view of the cable release bypass assembly.
Figure 10:
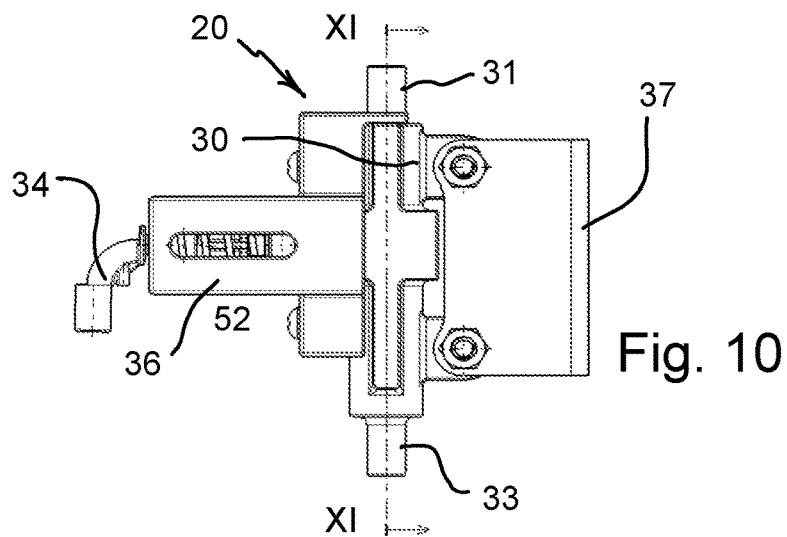
FIG. 10 is a side view of the cable release bypass assembly.

FIG. 7 shows the CRBA 20 with the connection by fasteners 39 to the bypass device bracket 37. FIG. 8A shows the CRBA 20 in a perspective view but from a side opposite to that shown in FIG. 7. In each of FIG. 7, 8A, 9, 10, 11, 12, the actuator guide piston end 31 is in the first input position, in which the actuator guide piston end 31 may be in a fixed position, to fix the position of the end of the release handle guide cable (sheaf) 22. FIG. 8B shows the view of FIG. 8A with the actuator guide piston end 31 moved to the second input position. This movement is caused by the release handle guide cable (sheaf) 22 moving to some extent with the movement of the actuator inner cable 23, as the release handle 16 moves with an actuating movement. It is this movement of the release handle guide cable (sheaf) 22 that causes what can be termed a loss motion or lost motion. This is termed a lost motion as there is a movement of the release handle guide cable (sheaf) 22 with the movement of the actuator inner cable 23, such that any movement of the actuator inner cable 23 at the actuatable device (the recliner latch 29) is insufficient to result in actuation. In other words, some of the motion of the actuator is lost to the CRBA 20 and is missing (lost) at actuatable device. This results in insufficient motion of the inner cable 23 at the recliner latch 29, thereby resulting in an actuating motion of the release handle (actuator) 16 that does not result in an actuation of the recliner latch (actuatable device) 29. The lost motion (the motion of travel of piston 40) is equal to or greater than the travel of the seatback release handle 16. The piston spring force of the piston spring 42 is lower than the spring force of the recliner latch 29 (or the total force required to release the latch 29). The recliner latch 29 is normally released by the seatback release handle 16 if the CRBA lock element 50 is engaged with the piston 40. When the lock element 50 is disengaged from the piston 40 and the release handle 16 is actuated, the piston 40 can move—providing the lost motion. This lost motion of the piston 40 occurs instead of the movement of the recliner latch 29 (because of the lower spring force of the piston spring 42 at piston 40 than the spring force that must be overcome at the recliner latch 29). Since the piston travel of piston 40 is greater than the travel of the release handle 16, the handle 16 reaches a release handle travel limit before the limit to the piston travel of piston 40.

Figure 13A:
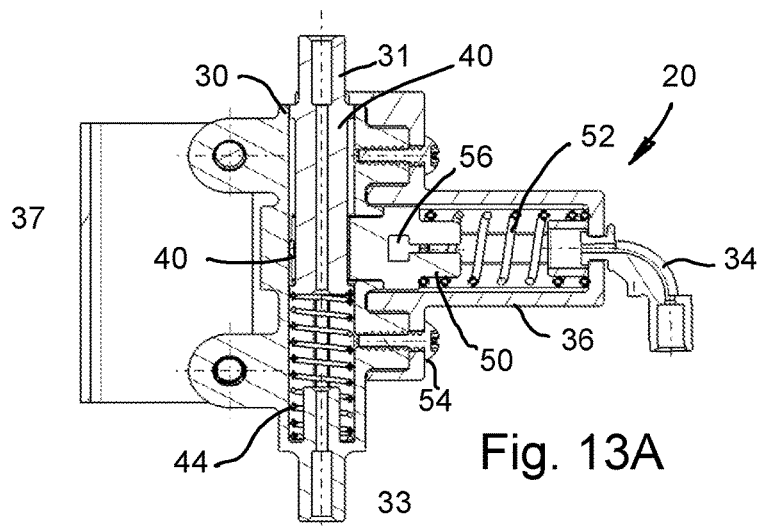
FIG. 13A is a sectional view taken along line XIII-XIII of FIG. 12, showing an actuator guide cable piston locked by a lock element.
Figure 13B:
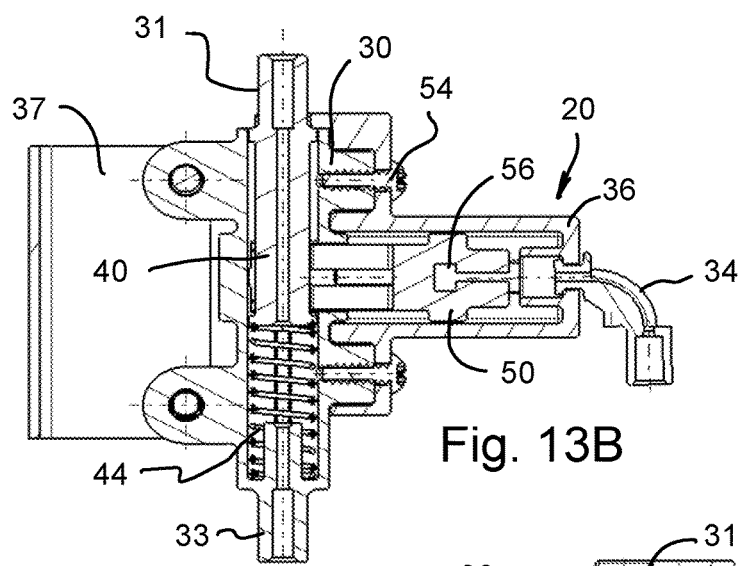
FIG. 13B is a view corresponding to FIG. 13A, showing the actuator guide cable piston in an unlocked state, and showing the arrangement with the lock element biasing spring removed.
Figure 13C:
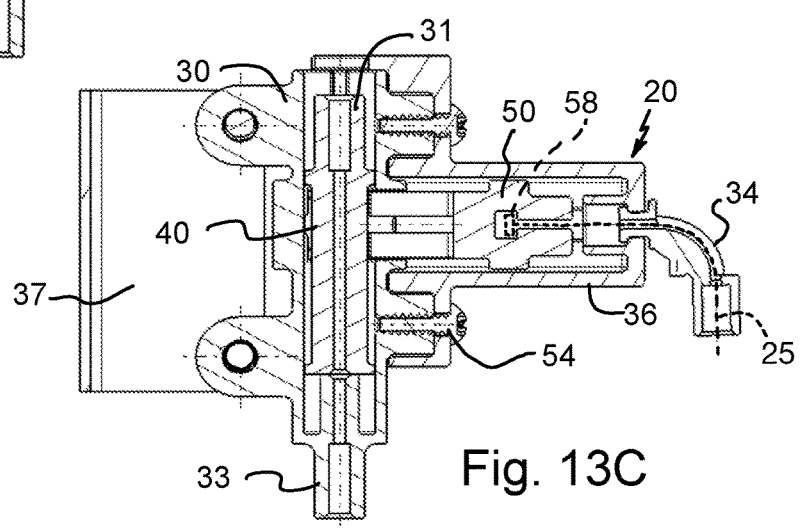
FIG. 13C is a view corresponding to FIG. 13B, showing the actuator guide cable piston in an unlocked state and moved to a position corresponding to the second input position, and showing the arrangement with both the piston biasing spring and the lock element biasing spring removed and showing the bypass input cable schematically in dashed line.

As can be seen in the sectional views of FIGS. 11, 13A, 13B and 13C, the CRBA 20 includes the bypass device housing 30, which carries the sheaf piston element 40 and carries a piston biasing spring 44. The piston biasing spring 44 has a sufficient spring force to position the piston 40 in the first input position (FIGS. 11, 13A, 13B). However, the spring force of the piston 40 is sufficiently weak such that the piston 40 and the release handle guide cable (sheaf) 22 move against the piston spring when the release handle (actuator) 16 is actuated and the piston 40 is unlocked.

The bypass device housing 30 is connected to the bypass input unit housing 36 to support the lock element 50 and to support the lock spring 52. The lock spring 52 biases the lock element 50 into a locked position. As can be seen in FIG. 13A, in the locked position the lock element 50 is in contact with the piston 40. The lock element 50, engaging the piston 40 in the first input position, can also be seen in FIG. 11. The lock element 50 is moved back against the spring force by movement of the bypass input inner cable 25, based on movement of the seat base 14, as discussed with reference to FIGS. 6A and 6B. The pulling movement of the bypass input inner cable 25 pulls the lock element 50, resulting in an unlocked state of the lock element 50 as shown in FIGS. 13B and 13C. When the release handle 16 is actuated with the lock element as shown in FIG. 13B, the piston 40, with the attached sheaf 22, moves to the position as shown in FIG. 13C, resulting in the lost motion, wherein the inner cable 23 at the recliner latch 29 does not acuate the latch 29. FIG. 13C shows the cable 25 schematically, showing the path of the cable 25 through the cable fitting 34.

The lost motion (travel of piston 40) is greater than the travel of the seatback release handle. The piston spring force is lower than the spring force of the latch. The latch is normally released by the seatback release handle if the CRBA lock element is engaged. When the lock element is disengaged and the release handle is actuated, the piston can move (lost motion) instead of the latch, (lower spring force at piston). Since the piston travel is greater than the travel of the seatback release handle, the handle reaches its travel limit.

FIG. 14 shows an exploded view of the CRBA 20. The lock element 50 includes a body with metal lock pins 51 which provide sufficient strength for engaging the piston 40. The body of the lock element 50 includes slot follower portions 53, which engage in and follow a path provided by the slots 48, formed in the bypass device housing 30 (FIG. 17). The slots 48 include slot portions for receiving the metal pins 51. With this configuration, the lock pins 51 engage into the piston and also engage into the housing for additional strength. The metal lock pins 51 are mounted in the lock element 50 and extend along an inner surface of the slot follower portions 53. The lock element 50 also includes a bypass input inner cable receiving slot 55 and a bypass input inner cable end fixing slot 56. With this configuration, a fixing element 58 (shown in dashed line in FIG. 13C) at an end of the bypass input inner cable 25, may be passed through an opening of the cable end fixing slot 56, with the inner cable 25 passing through the results evening slot 25. This allows the fixing element 58 to be retained in the end fixing slot 56. With this configuration the pulling of the inner cable 25 pulls the lock element 50 against the force of the lock biasing spring 52.

Figure 19:
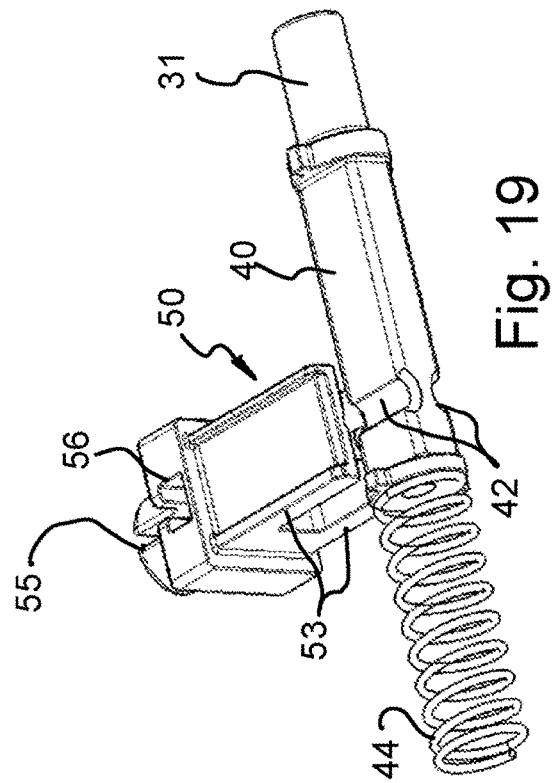
FIG. 19 is a view showing the interaction between the locking element and the actuator guide cable piston in an unlocked state, corresponding to the state shown in FIGS. 13B and 13C.
Figure 18:
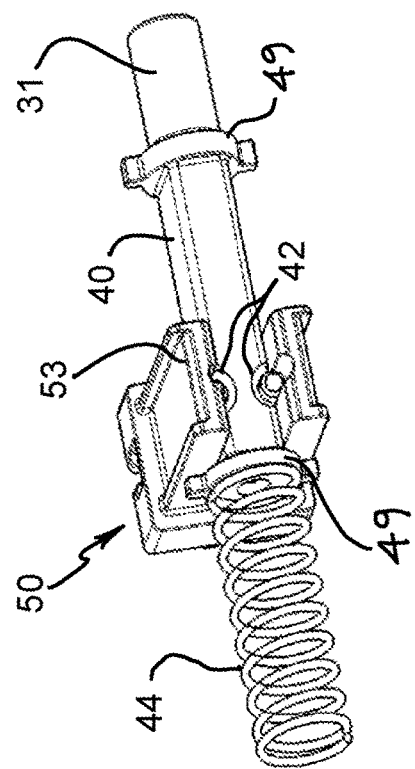
FIG. 18 is a view showing the interaction between the locking element and the actuator guide cable piston in a locked state, corresponding to the state shown in FIG. 13A.

FIGS. 18 and 19 show the interaction between the lock element 50 and the piston 40. The piston 40 includes the locking grooves 42, which have a configuration with a contour to receive the locking pins 51 of the lock element 50. Additionally, the piston 40 includes axial end stops 49, which interact with the housing 30 to limit the travel path of the piston 40. The piston 40 has an circumferential surface with flattened zones 44 for interaction with the slot follower portions 53.

The various parts of the CRBA 20, such as the bypass device housing 30, the bypass input unit housing 36, the lock element 50 and the sheaf piston element 40 may be made of plastic. The springs 44 and 52, the fasteners 39 and 54, pins 51 and the mounting bracket 37 may be formed of metal. However variation are possible as to the materials and the shapes of the parts.

Although the cable release bypass system is shown used with a vehicle seat, the system may be used with other applications in which the actuation movement of the actuating cable is to be functionally bypassed, namely to prevent actuation in certain situations. The bypass function is triggered by the additional input. The system provides the additional input so as to change the effect of the first input on the output of the system. This is advantageously accomplished with the use of a cable that extends from the first input to the output. It is particularly advantageous that this system allows the actuator to be fully actuated, the release handle 16 may be fully moved, with this movement in the second input state not resulting in any actuation at the actuatable device. This bypass action is believed to be advantageous and may be preferable over a system in which the actuator is blocked and is prevented from any movement.

Although a vehicle seat is disclosed in which the additional input (the bypass input) is a function of the pivot position of the seat base/cushion (the design position or the stadium position) other applications may advantageously use the cable release bypass system according to the invention. With regard to vehicle seats the state of some other part or sets of parts of the seat may provide the additional input. The actuatable device may be related to features other than the backrest fixture latch. For example, the position of rails, or the locking thereof, of a longitudinal seat movement system may be controlled whereby the movement of the seat base, backrest or other parts may provide the additional input or may have the features with the actuatable device.

While specific embodiments of the invention have been shown and described in detail to illustrate the application of the principles of the invention, it will be understood that the invention may be embodied otherwise without departing from such principles.

APPENDIX I: LIST OF REFERENCE CHARACTERS 10 vehicle seat
11 seat base to backrest link arm
12 backrest
13 headrest
14 seat base
15 seat base pivot
16 release handle (actuator)
17 backrest link arm pivot connection
18 support base
19 stadium seat actuator lever
20 cable release bypass device (assembly)
22 release handle guide cable (sheaf)
23 actuator inner cable
24 bypass input guide cable (sheaf)
25 bypass input inner cable
26 recliner latch guide cable (sheaf)
27 bypass input inner cable support
29 recliner latch
30 bypass device housing
31 actuator guide cable piston end
33 actuated guide cable housing connection
34 bypass input cable 90° fitting
36 bypass input unit housing
37 bypass device bracket
38 backrest frame side bracket
39 bracket fasteners
40 sheaf piston element
42 locking grooves
44 piston biasing spring
48 engagement slots
49 piston end stops
50 lock element
51 metal lock pins
52 input unit lock biasing spring
53 slot follower
54 input unit fasteners
55 bypass input inner cable receiving slot
56 bypass input inner cable end fixing slot

What is claimed is:

1. A cable actuator system comprising:
an actuating cable for connection to an actuator and for connection to an actuatable device; and
a bypass assembly connected to the actuating cable, the bypass assembly comprising a bypass input with a first input position and a second input position wherein:
with the bypass input in the first input position the bypass assembly acts on the cable such that an actuating movement of the cable by the actuator moves the cable an actuating distance at the actuatable device to actuate the actuatable device;
with the bypass input in the second input position the bypass assembly acts on the cable such that the actuating movement of the cable by the actuator does not move the cable the actuating distance at the actuatable device;
the actuating cable comprises an inner cable having an actuator end for connection to an actuator and an actuatable device end for connection to an actuatable device;
the actuating cable further comprises a sheaf with a sheaf bypass assembly end and an actuator end; and
the bypass assembly comprises:
a bypass housing; and
a sheaf piston positioned for limited movement in the bypass assembly, the sheaf bypass assembly end being fixed to the sheaf piston, wherein the bypass input comprises a locking arrangement fixing a position of the sheaf piston relative to the bypass housing in the first input position and releasing the sheaf piston in the second input position to allow limited movement of the sheaf piston relative to the bypass housing.

2. A cable actuator system according to claim 1, wherein:
the bypass assembly further comprises a biasing spring biasing the sheaf piston, with a biasing force, into the first input position for being locked by the locking arrangement; and
in the second input position the limited movement of the sheaf piston relative to the bypass housing is movement against the biasing force of the biasing spring.

3. A cable actuator system according to claim 2, wherein the biasing spring, the bypass housing and the sheaf piston element are configured to establish the limited movement of the sheaf piston relative to the bypass housing against the biasing force of the biasing spring such that the limited movement is greater than an actuating distance movement of the cable at the actuatable device to actuate the actuatable device.

4. A cable actuator system according to claim 1, wherein the bypass input locking arrangement further comprises:
an input unit housing portion connected to or forming a portion of the bypass housing;
a lock element; and
a lock element biasing spring supported by the input unit housing portion and biasing the lock element into a locked position with the sheaf piston in the first input position.

5. A cable actuator system according to claim 4, wherein the bypass input further comprises an input cable with an outer sheaf connected to the input unit housing portion and an inner cable connected to the lock element to move the lock element from a locked position corresponding to the first input position to an unlocked position corresponding to the second input position.

6. A cable actuator system according to claim 4, wherein the bypass housing holds the lock biasing spring and also forms a stop for piston at locked position, whereby bypass housing holds the lock biasing spring in place above the lock element.

7. A cable actuator system according to claim 4, wherein the lock element comprises metal lock pins supported by a lock body, the pins engaging the piston to lock the piston in the position of the sheaf piston relative to the bypass housing corresponding to the first input position and releasing the sheaf piston in the second input position to allow limited movement of the sheaf piston relative to the bypass housing and wherein the lock pins engage the bypass housing for additional strength.

8. A vehicle seat comprising:
a seat base;
a backrest mounted to pivot relative to the seat base;
an actuator moveable from a rest position to a release actuating position;
a vehicle seat actuatable device; and
a cable actuator system comprising:
an actuating cable connected to the actuator and connected to the vehicle seat actuatable device; and
a bypass assembly connected to the actuating cable, the bypass assembly comprising a bypass input with a first input position and a second input position wherein:
with the bypass input in the first input position the bypass assembly acts on the cable such that an actuating movement of the cable by the actuator moves the cable an actuating distance at the vehicle seat actuatable device to actuate the vehicle seat actuatable device; and
with the bypass input in the second input position the bypass assembly acts on the cable such that the actuating movement of the cable by the actuator does not move the cable the actuating distance at the vehicle seat actuatable device;
a fitting with a release latch is connected to the backrest, the fitting with the release latch preventing the backrest from pivoting forward relative to the seat base in a latched state and releasing the backrest to pivot forward relative to the seat base in a released state;
the actuator is a release actuator operatively connected to the cable actuator system;
the vehicle seat actuatable device is the release latch and is operatively connected to the cable actuator system;
the seat base is mounted to pivot up toward the backrest from a seat design position to a stadium position;
the seat base is operatively connected to the bypass input of the cable actuator system;
movement of the seat base from the design position to the stadium position changes the bypass input from the first input position to the second input position such that movement of the release actuator from the rest position to the release actuating position does not release the release latch; and
movement of the seat base from the stadium position to the design position changes the bypass input from the second input position to the first input position such that movement of the release actuator from the rest position to the release actuating position does release the release latch.

9. A vehicle seat according to claim 8, wherein the actuating cable comprises an inner cable having an actuator end for connection to an actuator and an vehicle seat actuatable device end for connection to an vehicle seat actuatable device.

10. A vehicle seat according to claim 9, wherein:
the actuating cable further comprises a sheaf with a sheaf bypass assembly end and an actuator end;
the bypass assembly comprises:
a bypass housing;
a sheaf piston element positioned for limited movement in the bypass assembly, the sheaf bypass assembly end being fixed to the sheaf piston element, wherein the bypass input comprises a locking arrangement fixing a position of the sheaf piston element relative to the bypass housing in the first input position and releasing the sheaf piston in the second input position to allow limited movement of the sheaf piston element relative to the bypass housing.

11. A vehicle seat according to claim 10, wherein:
the bypass assembly further comprises a biasing spring biasing the sheaf piston element, with a biasing force, into the first input position for being locked by the locking arrangement; and
in the second input position the limited movement of the sheaf piston element relative to the bypass housing is movement against the biasing force of the biasing spring.

12. A vehicle seat according to claim 11, wherein the biasing spring, the bypass housing and the sheaf piston element are configured to establish the limited movement of the sheaf piston element relative to the bypass housing against the biasing force of the biasing spring such that the limited movement is greater than the actuating distance movement of the cable at the vehicle seat actuatable device to actuate the vehicle seat actuatable device.

13. A vehicle seat according to claim 10, wherein the bypass input locking arrangement further comprises:
an input unit housing portion connected to or forming a portion of the bypass housing;
a lock element; and
a lock element biasing spring supported by the input unit housing portion and biasing the lock element into a locked position with the sheaf piston element in the first input position.

14. A vehicle seat according to claim 13, wherein the bypass input further comprises an input cable with an outer sheaf connected to the input unit housing portion and an inner cable connected to the lock element to move the lock element from a locked position corresponding to the first input position to an unlocked position corresponding to the second input position.

15. A vehicle seat according to claim 13, wherein the bypass housing holds the lock biasing spring and also forms a stop for piston at locked position.

16. A vehicle seat according to claim 13, wherein the lock element comprises metal lock pins supported by a lock body, the pins engaging the piston to lock the piston in the position of the sheaf piston relative to the bypass housing corresponding to the first input position and releasing the sheaf piston in the second input position to allow limited movement of the sheaf piston relative to the bypass housing and wherein the lock pins engage the bypass housing for additional strength.

\* \* \* \* \*